United States Patent
Suga (10) Patent No.: US 9,481,092 B2
(45) Date of Patent: Nov. 1, 2016

(54) GEAR GRIPPING DEVICE AND METHOD FOR GRIPPING A GEAR

(71) Applicant: FANUC CORPORATION, Yamanashi (JP)

(72) Inventor: Keisuke Suga, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/959,496

(22) Filed: Dec. 4, 2015

(65) Prior Publication Data

US 2016/0167235 A1  Jun. 16, 2016

(30) Foreign Application Priority Data

Dec. 10, 2014 (JP) .................................. 2014-250156

(51) Int. Cl.
- *B66C 1/42* (2006.01)
- *B25J 15/00* (2006.01)
- *B25J 15/02* (2006.01)

(52) U.S. Cl.
CPC ......... *B25J 15/0028* (2013.01); *B25J 15/0253* (2013.01)

(58) Field of Classification Search
CPC .............. B25J 15/0028; B25J 15/0253; B25J 15/0273; B25J 15/106; B23Q 3/06; B66F 9/183
USPC ....................................... 294/119.1, 207, 902
See application file for complete search history.

(56) References Cited

U.S. PATENT DOCUMENTS

| | | | | |
|---|---|---|---|---|
| 5,253,912 A | * | 10/1993 | Andorlini | ................ B25J 15/02 29/732 |
| 6,270,136 B1 | * | 8/2001 | Dagenais | .............. E21B 19/163 294/119.1 |
| 2004/0051326 A1 | * | 3/2004 | Belik | ...................... B25B 5/147 294/86.15 |
| 2014/0138502 A1 | * | 5/2014 | Hall | ...................... B60C 25/125 248/205.1 |

FOREIGN PATENT DOCUMENTS

JP      8174360 A      7/1996

OTHER PUBLICATIONS

English Abstract and Machine Translation for Japanese Publication No. 08-174360, published Jul. 9, 1996, 11 pgs.

* cited by examiner

*Primary Examiner* — Gabriela Puig
(74) *Attorney, Agent, or Firm* — Fredrikson & Byron, P.A.

(57) ABSTRACT

A device which prevents a gear from ending up being damaged while enabling the gear to be more easily and suitably gripped is provided. A gear gripping device 10 comprises a pawl which is provided to be able to move so as to approach a circumference of a gear G and which can engage with a gear groove which is formed at the circumference of the gear, a first drive part 18 which drives the pawl to abut against the circumference of the gear G, a second drive part 20 which makes the gear G rotate in the circumferential direction of the gear G, and an engagement detection part 50 which detects if the pawl has engaged with the gear groove.

8 Claims, 8 Drawing Sheets

FIG. 8

GEAR GRIPPING DEVICE AND METHOD FOR GRIPPING A GEAR

BACKGROUND OF THE INVENTION

1. Field of the Invention

The invention relates to a gear gripping device and a method for gripping a gear to prevent it from rotating.

2. Description of the Related Art

Known in the art is a device which uses a clamp part which has pawls which can mesh with gear grooves which are formed at a circumference of a gear so as to clamp the gear and thereby grip the gear to prevent it from rotating (for example, Japanese Patent Publication No. 8-174360A).

A device which can prevent a gear from being damaged while being able to more easily and suitably grip the gear has been sought.

SUMMARY OF THE INVENTION

In an aspect of the invention, a gear gripping device comprises a pawl which is provided to be movable so as to approach a circumference of a gear and capable of engaging a gear groove which is formed at the circumference of the gear; a first drive part which drives the pawl so as to abut against the circumference of the gear; a second drive part which rotates the gear in a circumferential direction of the gear; and an engagement detection part which detects whether the pawl engages the gear groove.

The gear gripping device may further comprise a pair of clamp parts which are provided to be movable so as to approach each other. Each of the pair of clamp parts includes the pawl. The first drive part may drive the pair of clamp parts so as to approach each other, thereby hold the circumference of the gear between the pair of clamp parts. The first drive part or the second drive part may include a servo motor.

The engagement detection part may monitor the load torque which is applied to the second drive part during the pawl abuts against the circumference of the gear. The engagement detection part may detect that the pawl engages the gear groove, when the load torque changes. The engagement detection part may monitor the displacement of the pawl during the pawl abuts against the circumference of the gear. The engagement detection part may detect that the pawl engages the gear groove, when the displacement occurs.

In another aspect of the invention, a method of gripping a gear comprises moving a pawl capable of engaging a gear groove formed at the circumference of the gear, and abutting the pawl against the circumference of the gear; rotating the gear in a circumferential direction of the gear; and detecting whether the pawl engages the gear groove.

The method may further comprise monitoring a load torque applied to a drive part for rotating the gear, after abutting the pawl against the circumference of the gear; and detecting that the pawl engages the gear groove, when the load torque changes.

The method may further comprise monitoring a displacement of the pawl, after abutting the pawl against the circumference of the gear; and detecting that the pawl engages the gear groove, when the displacement occurs.

BRIEF DESCRIPTION OF THE DRAWINGS

These and other objects, features, and advantages of the invention will be clarified with reference to the detailed description of illustrative embodiments of the invention shown in the attached drawings, in which.

DETAILED DESCRIPTION

Below, embodiments of the invention will be explained in detail based on the drawings. First, referring to FIG. 1 to FIG. 3, a gear gripping device 10 according to an embodiment of the invention will be explained. Note that, in the following description, the "axial direction" indicates the direction along a center axis O of a gear G, the "radial direction" indicates the radial direction of a circle centered about the axis O, and the "circumferential direction" indicates the circumferential direction of the circle centered about the axis O.

Figure 1:
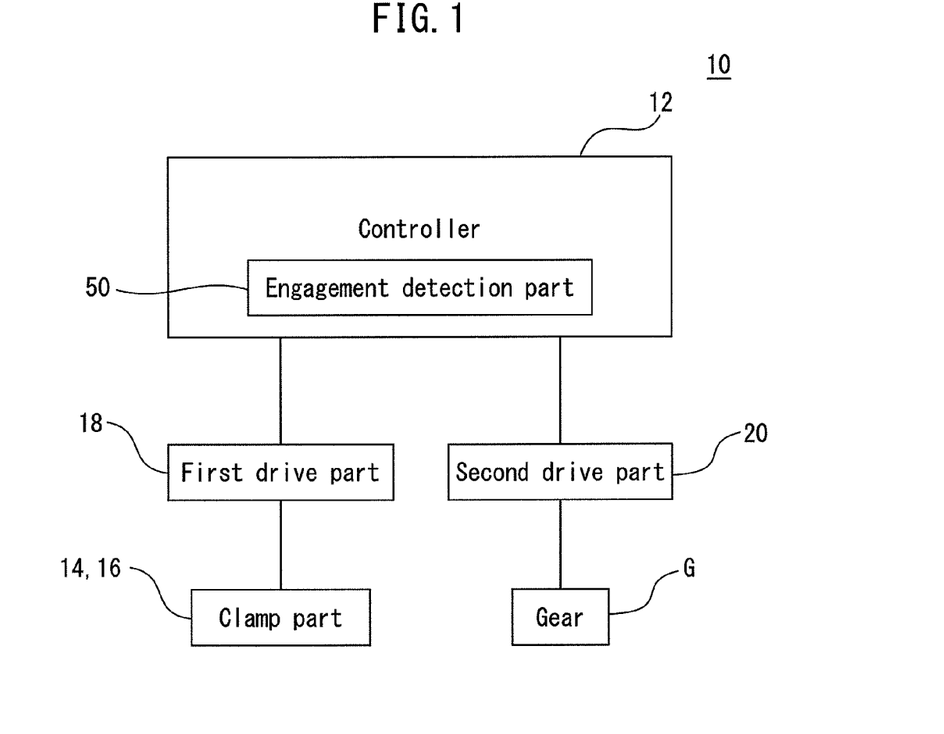
FIG. 1 is a block diagram of a gear gripping device according to an embodiment of the invention.

The gear gripping device 10 is for nipping the circumference of the gear G from radially outside so as to unrotatably gripping the gear G. The gear gripping device 10 includes a controller 12, a pair of a first clamp part 14 and second clamp part 16, a first drive part 18, and a second drive part 20.

Figure 2:
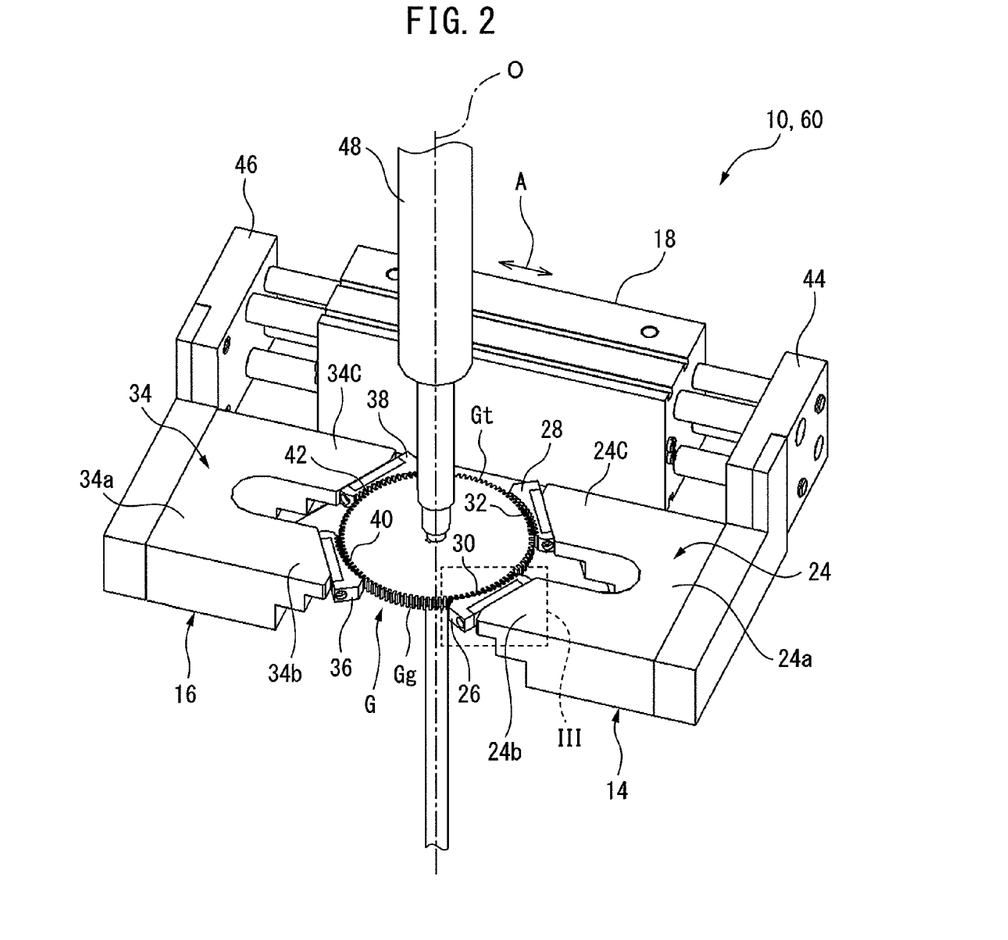
FIG. 2 is a perspective view of the gear gripping device shown in FIG. 1.

The controller 12 directly or indirectly controls each element of the gear gripping device 10. The first clamp part 14 and the second clamp part 16 are arranged to be opposite to each other. When gripping the gear G by the gear gripping device 10, the gear G is arranged between the first clamp part 14 and the second clamp part 16, as shown in FIG. 2.

The first clamp part 14 is arranged at one radial side of the gear G, and includes a substantially U-shaped clamp arm 24 and two of pawl members 26 and 28 attached to the clamp arm 24.

The clamp arm 24 includes a base 24a and a pair of arms 24b and 24c extending from the base 24a toward the gear G. The pawl members 26 and 28 are respectively attached to the distal ends of the arms 24b and 24c.

Figure 3:
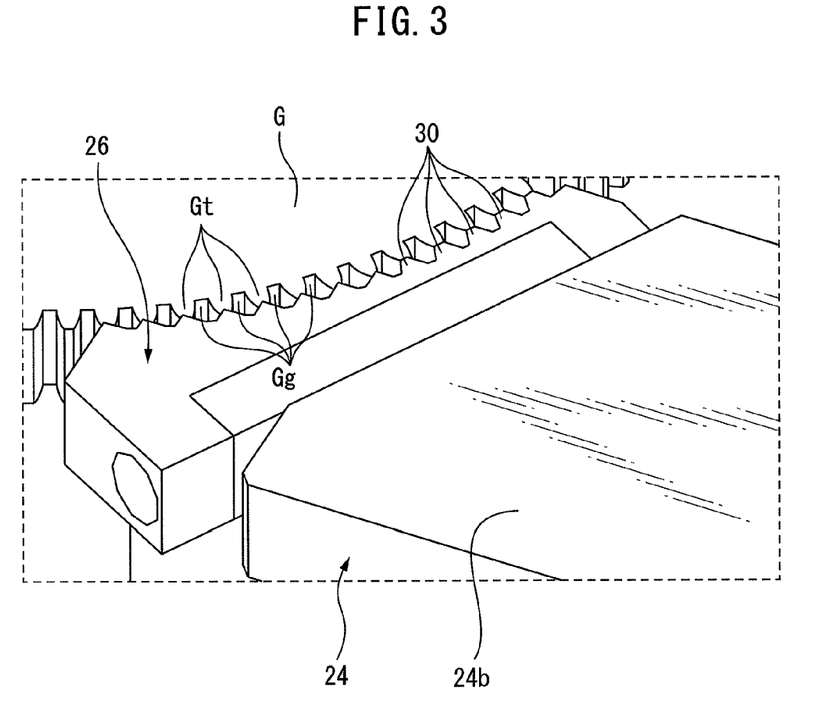
FIG. 3 is an enlarged view of the region III in FIG. 2.

As shown in FIG. 3, the pawl member 26 includes a plurality of pawls 30 provided at a side facing the gear G. These pawls 30 are arranged so as to project out toward the axis O and to align in the circumferential direction along the circumference of the gear G.

On the other hand, a plurality of teeth $G_t$ are formed at the circumference of the gear G so as to align in the circumferential direction. Each of gear grooves $G_g$ is defined between two teeth $G_t$ adjoining each other in the circumferential direction. Each of the pawls 30 is provided so as to be capable of engaging each of the gear grooves $G_g$ formed at the circumference of the gear G.

The pawl member 28 has a configuration similar to the above-mentioned pawl member 26. Specifically, the pawl member 28 includes a plurality of pawls 32 provided to project out toward the axis O and align in the circumferential direction. Each of the pawls 32 can engage the gear groove $G_g$.

The second clamp part 16 has a configuration similar to the above-mentioned first clamp part 14, and is arranged to be symmetrical with the first clamp part 14 with respect to the axis O. Specifically, the second clamp part 16 is arranged at the other radial side of the gear G, and includes a substantially U-shaped clamp arm 34 and two of pawl members 36 and 38 attached to the clamp arm 34.

The clamp arm 34 includes a base 34a and a pair of arms 34b and 34c. The pawl members 36 and 38 are respectively attached to the distal ends of the arms 34b and 34c.

The pawl members 36 and 38 respectively include pawls 40 and 42 provided so as to project out toward the axis O and align in the circumferential direction. Each of the pawls 40 and 42 can engage each of the gear grooves $G_g$.

The first drive part 18 drives the first clamp part 14 and second clamp part 16 in accordance with a command from the controller 12 so as to approach and separate away from each other. In this embodiment, the first drive part 18 includes a servo motor (not shown) and a motion conversion mechanism (not shown) connected to a rotary shaft of the servo motor.

The motion conversion mechanism includes e.g. a ball-screw mechanism and converts the rotational motion of the rotary shaft to reciprocating motion along the direction of the arrow A in FIG. 2. Note that, the direction of the arrow A is perpendicular to the axis O, and matches the direction in which the arms 24b, 24c, 34b, and 34c extend.

The first clamp part 14 is mechanically connected to the first drive part 18 via a connection member 44. One end of the connection member 44 is mechanically connected to the motion conversion mechanism of the first drive part 18, while the other end of the connection member 44 is connected to the base 24a of the clamp arm 24.

Similarly, the second clamp part 16 is mechanically connected to the first drive part 18 via a connection member 46. One end of the connection member 46 is mechanically connected to the motion conversion mechanism of the first drive part 18, while the other end of the connection member 46 is connected to the base 34a of the clamp arm 34. The first clamp part 14 and the second clamp part 16 are driven by the first drive part 18 so as to synchronously move in directions toward and away from each other.

The second drive part 20 drives the gear G to rotate in the circumferential direction in accordance with a command from the controller 12. In this embodiment, the second drive part 20 includes a servo motor (not shown). The gear G and the second drive part 20 are mechanically coupled with each other via a drive shaft 48 extending in the axial direction. One end of the drive shaft 48 is coupled with a rotary shaft (not shown) of the servo motor of the second drive part 20, while the other end of the drive shaft 48 is coupled with the center of the gear G.

Figure 4:
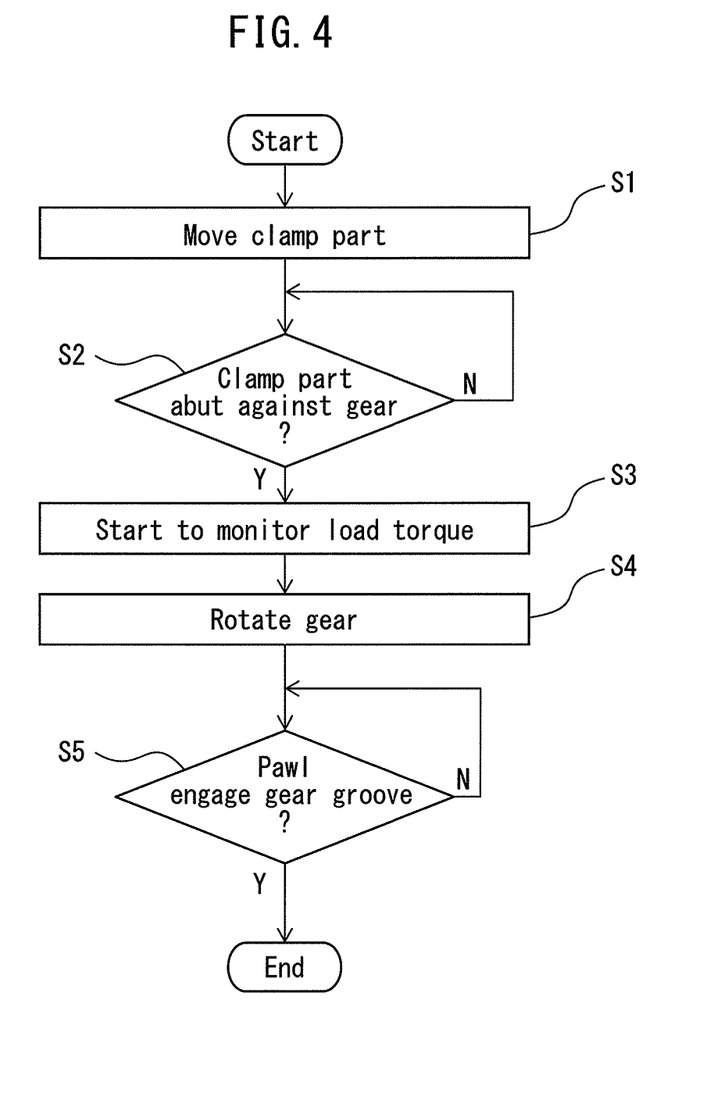
FIG. 4 is a flow chart of an example of an operation method of the gear gripping device shown in FIG. 1.

Next, referring to FIG. 1 to FIG. 6, the operation of the gear gripping device 10 according to this embodiment will be explained. The operation flow shown in FIG. 4 is started when the controller 12 receives a gear gripping command from a user and the gear G is arranged between the first clamp part 14 and the second clamp part 16 as shown in FIG. 2.

At step S1, the controller 12 moves the first clamp part 14 and the second clamp part 16. Specifically, the controller 12 sends a command to the first drive part 18 so as to move the first clamp part 14 and the second clamp part 16 to approach each other.

Along with this operation, the pawls 30 and 32 provided at the first clamp part 14 and the pawls 40 and 42 provided at the second clamp part 16 are moved to approach the circumference of the gear G.

The command sent to the first drive part 18 at this step S1 is set so that a force of magnitude which would not damage the gear G is given to the first clamp part 14 and the second clamp part 16, when the first clamp part 14 and the second clamp part 16 hold the gear G therebetween at step S2 described below.

At step S2, the controller 12 determines whether the first clamp part 14 and the second clamp part 16 abut against the gear G. As an example, the controller 12 receives feedback (load torque, feedback current, etc.) from the servo motor of the first drive part 18, and determines "YES" when the feedback becomes a value corresponding to a command (torque command or current command) sent to the first drive part 18.

As another example, the controller 12 may receive feedback from the servo motor of the first drive part 18, and determine "YES" when the feedback exceeds a predetermined threshold value. When having determined "YES" at step S2, the controller 12 proceeds to step S4. On the other hand, when having determined "NO" at step S2, the controller 12 loops step S2.

Note that, when having determined "YES" at step S2, the controller 12 may send a command to the first drive part 18 so as to stop the first clamp part 14 and the second clamp part 16. According to this configuration, it is possible to prevent excessive force from being applied to the gear G from the first clamp part 14 and the second clamp part 16, thereby prevent the gear G from being damaged.

When the first clamp part 14 and the second clamp part 16 abut against the gear G, the pawls 30, 32, 40, and 42 of the first clamp part 14 and the second clamp part 16 may fail to enter into the gear grooves $G_g$ by abutting the teeth $G_t$, thereby do not suitably engage the gear G.

FIG. 3 shows one example of such state. As shown in FIG. 3, in this state, the tip of each pawl 30 abuts against the tip of each tooth $G_t$, thereby the pawls 30 fail to enter into the gear grooves $G_g$.

In this case, the gear G is held between the first clamp part 14 and the second clamp part 16, but does not engage the pawls 30, 32, 40, and 42. Therefore, the gear G is not suitably gripped by the gear gripping device 10.

At step S3, the controller 12 starts to monitor the load torque of the second drive part 20. Specifically, the controller 12 receives feedback (load torque, feedback current, etc.) from the servo motor of the second drive part 20 at a predetermined period τ, from the time when having determined "YES" at step S2.

At step S4, the controller 12 rotates the gear G in the circumferential direction. Specifically, the controller 12 sends a command to the second drive part 20 so as to rotate the gear G in the circumferential direction via the drive shaft 48.

Figure 5:
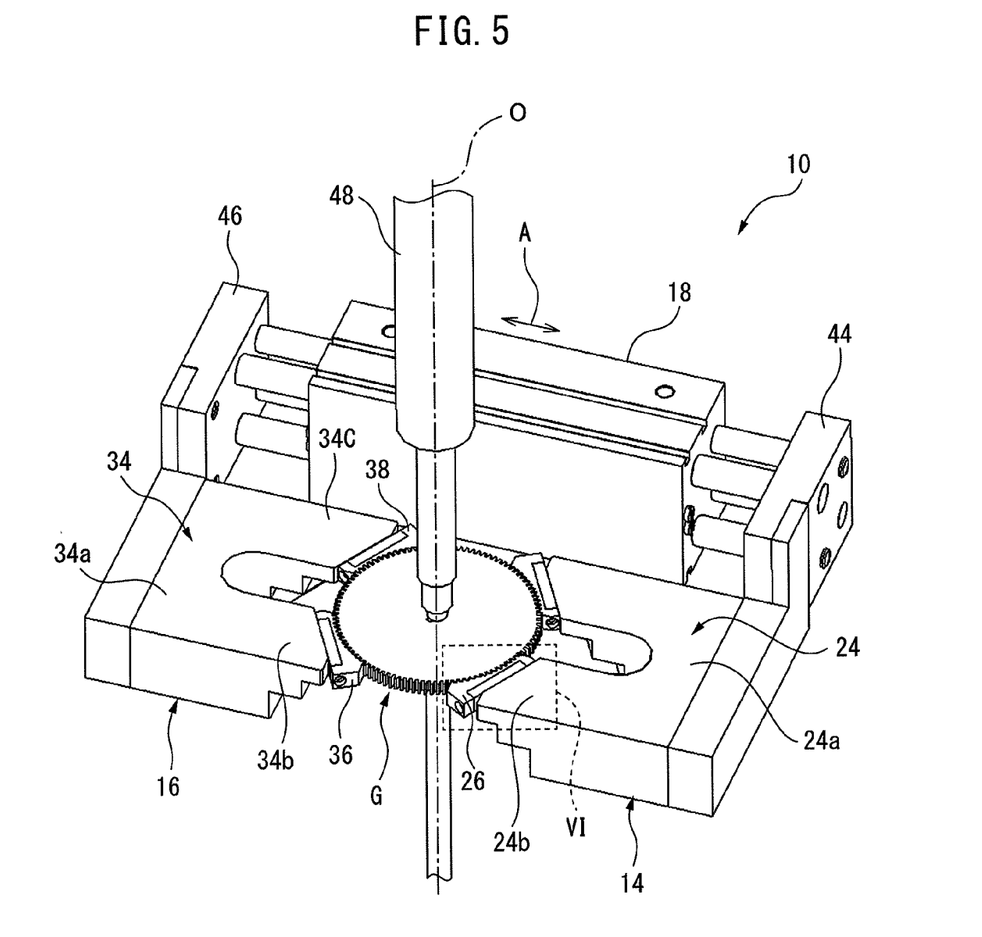
FIG. 5 is a perspective view which shows the state where the pawls of the gear gripping device shown in FIG. 2 engage the gear.
Figure 6:
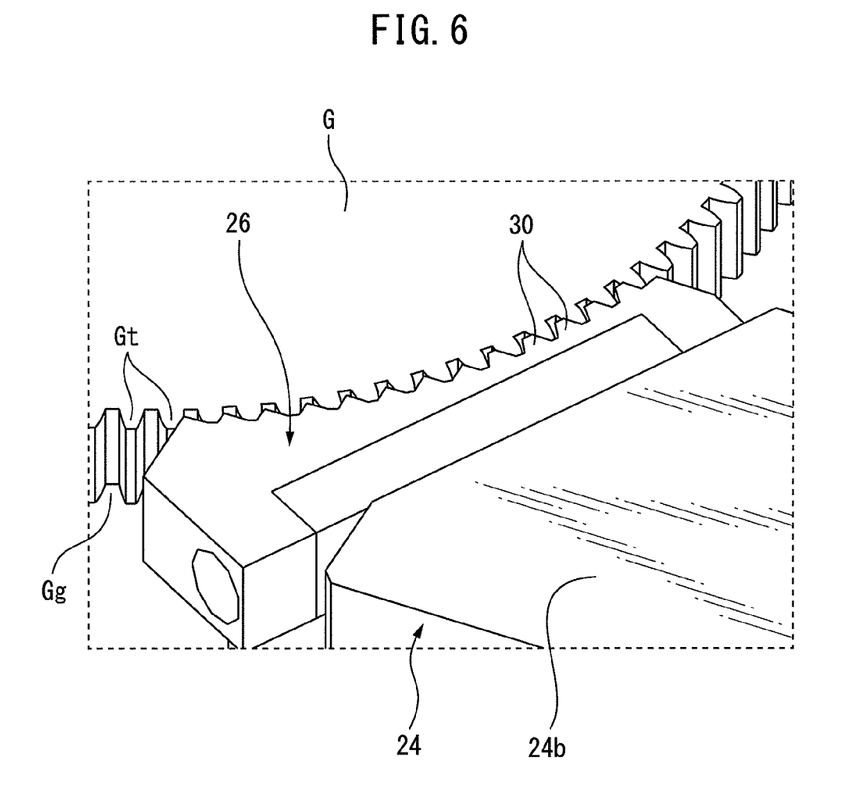
FIG. 6 is an enlarged view of the region VI in FIG. 5.

When the gear G is rotated from the state shown in FIG. 3 in this way, the pawls 30, 32, 40, and 42 are displaced relative to the teeth $G_t$ in the circumferential direction, then enter into the gear grooves $G_g$, thereby engage the gear grooves $G_g$. As a result, the pawls 30, 32, 40, and 42 suitably engage the gear G. This state is shown in FIG. 5 and FIG. 6.

At step S5, the controller 12 determines whether the pawls 30, 32, 40, and 42 have suitably engaged the gear grooves $G_g$. As shown in FIG. 5 and FIG. 6, if the pawls 30, 32, 40, and 42 enter into the gear grooves $G_g$ so as to engage the gear grooves $G_g$, the rotation of the gear G is restricted by the pawls 30, 32, 40, and 42.

At this time, the load torque applied to the second drive part 20 increases. In this embodiment, after determined "YES" at step S2, the controller 12 monitors the load torque applied to the second drive part 20, and determines that the pawls 30, 32, 40, and 42 have suitably engaged the gear grooves $G_g$ when detecting the change in the load torque. Thus, the controller 12 functions as an engagement detection part 50 (FIG. 1).

As an example, the controller 12 detects that the load torque of the second drive part 20 has changed, when the feedback of the second drive part 20 periodically received at step S3 exceeds a predetermined threshold value.

As another example, with respect to feedback of the second drive part 20 periodically received at the step S3, the controller 12 detects that the load torque of the second drive part 20 has changed, when the difference between two feedbacks acquired at two time points which are sequential in time-series exceeds a predetermined threshold value.

As still another example, the controller 12 detects that the load torque of the second drive part 20 has changed, when the received feedback from the second drive part 20 becomes a value corresponding to the command (torque command or current command) sent to the second drive part 20.

When detecting the change in the load torque, the controller 12 determines that the pawls 30, 32, 40, and 42 have suitably engaged the gear grooves $G_g$ (i.e., determines "YES"), and ends the flow shown in FIG. 4. On the other hand, when the controller 12 could not detect the change in the load torque at step S5, the controller 12 determines that the pawls 30, 32, 40, and 42 have not yet engaged the gear grooves $G_g$ (i.e., determines "NO"), and loops the step S5.

In this way, according to this embodiment, the controller 12 clamps the gear G with a relatively weak force which would not damage the gear G, then rotates the gear G so as to suitably engage the pawls 30, 32, 40, and 42 with the gear G. According to this configuration, it is possible to suitably engage the pawls 30, 32, 40, and 42 with the gear G, while reliably preventing the gear G from being damaged.

Further, according to this embodiment, since the damage onto the gear G is prevented as stated above, it is not necessary to provide any means for preventing the damage to the gear G, for example, a damper mechanism for dampening the impact given to the gear G from the pawls 30, 32, 40, and 42. Therefore, the configuration of the first clamp part 14 and the second clamp part 16 can be simplified.

Further, according to this embodiment, the controller 12 detects whether the gear grooves $G_g$ and the pawls 30, 32, 40, and 42 have engaged each other based on the change in the load torque applied to the second drive part 20. According to this configuration, it is possible to detect the engagement between the gear grooves $G_g$ and pawls 30, 32, 40, and 42 by a simple device with a high accuracy.

Figure 7:
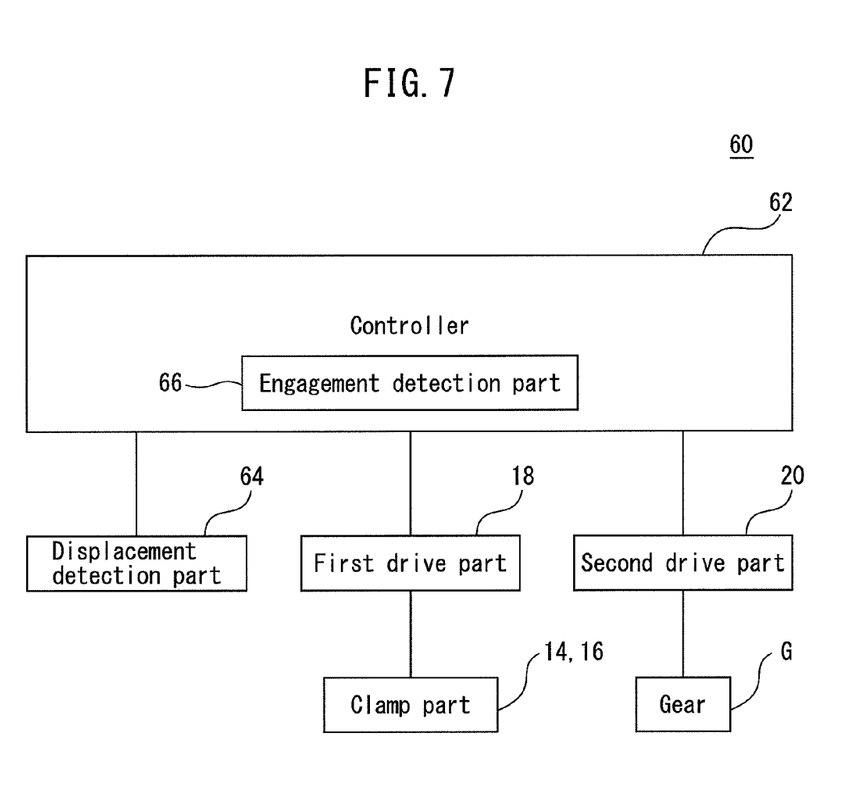
FIG. 7 is a block diagram of a gear gripping device according to another embodiment of the invention.

Next, referring to FIG. 2 and FIG. 7, a gear gripping device 60 according to another embodiment of the invention will be explained. Note that, elements similar to the above-mentioned embodiment will be assigned the same reference numerals, and detailed explanations thereof will be omitted.

A gear gripping device 60 includes a controller 62, the pair of the first clamp part 14 and the second clamp part 16, the first drive part 18, the second drive part 20, and a displacement detection part 64. The controller 62 directly or indirectly controls each element of the gear gripping device 60. The displacement detection part 64 detects displacements of the pawls 30, 32, 40, and 42 in accordance with a command from the controller 62.

As an example, the displacement detection part 64 includes an encoder which detects a rotational angle of the servo motor of the first drive part 18. In this case, the displacement detection part 64 detects the rotational angle of the servo motor as a parameter which indicates the positions of the pawls 30, 32, 40, and 42.

The deviation in the rotational angle of the servo motor correlates with the displacements of the pawls 30, 32, 40, and 42. Therefore, by detecting the change in the rotational angle of the servo motor, it is possible to evaluate the displacements of the pawls 30, 32, 40, and 42.

As another example, the displacement detection part 64 may include a displacement meter which directly measures a displacement of a movable element moved by the first drive part 18, such as the first clamp part 14, the second clamp part 16, the connection member 44, or the connection member 46.

The displacement of movable element such as the first clamp part 14, the second clamp part 16, the connection member 44, or the connection member 4 correlates with the displacements of the pawls 30, 32, 40, and 42. Therefore, by detecting the displacement of the movable element, it is possible to evaluate the displacements of the pawls 30, 32, 40, and 42.

Next, referring to FIG. 2, FIG. 7, and FIG. 8, the operation of the gear gripping device 60 according to this embodiment will be explained. Note that, in the operation flow shown in FIG. 8, the steps similar to the above-mentioned operation flow shown in FIG. 4 are assigned the same reference numerals, and detailed explanations thereof will be omitted.

At step S3', the controller 62 starts to monitor the displacements of the pawls 30, 32, 40, and 42. Specifically, the controller 62 sends a command to the displacement detection part 64 so as to acquire data relating to the displacements of the pawls 30, 32, 40, and 42 at a predetermined period τ, from the time when having determined "YES" at step S2 and.

As an example, if the displacement detection part 64 includes the above-mentioned encoder, the controller 62 receives the rotational angle of the servo motor of the first drive part 18 at a predetermined period τ. As another example, if the displacement detection part 64 includes the above-mentioned displacement meter, the controller 62 receives the position data of the movable element, such as the first clamp part 14, the second clamp part 16, the connection member 44, or the connection member 46, from the displacement meter at the predetermined period τ.

At step S5', the controller 62 determines whether the pawls 30, 32, 40, and 42 have suitably engaged the gear grooves $G_g$. Here, if the gear G is rotated at step S4, the pawls 30, 32, 40, and 42 in the state shown in FIG. 4 enter into the gear grooves $G_g$, thereby transition to the state shown in FIG. 6. At this time, the positions of the pawls 30, 32, 40, and 42 are displaced in a direction toward the axis O.

In this embodiment, after having determined "YES" at step S2, the controller 62 monitors the displacements of the pawls 30, 32, 40, and 42, and determines that the pawls 30, 32, 40, and 42 have suitably engaged the gear grooves $G_g$ when detecting such displacements. Thus, the controller 62 functions as an engagement detection part 66 (FIG. 7).

As an example, if the displacement detection part 64 includes the above-mentioned encoder, the controller 62 detects that the pawls 30, 32, 40, and 42 have displaced when the rotational angle of the servo motor of the first drive part 18 periodically received at step S3 exceeds a predetermined threshold value.

Further, as another example, if the displacement detection part 64 includes the above-mentioned displacement meter, the controller 62 detects that the pawls 30, 32, 40, and 42 have displaced when the difference between two position data acquired at two time points which are sequential in time series exceeds a predetermined threshold value, with respect to the position data periodically received at step S3'.

Figure 8:
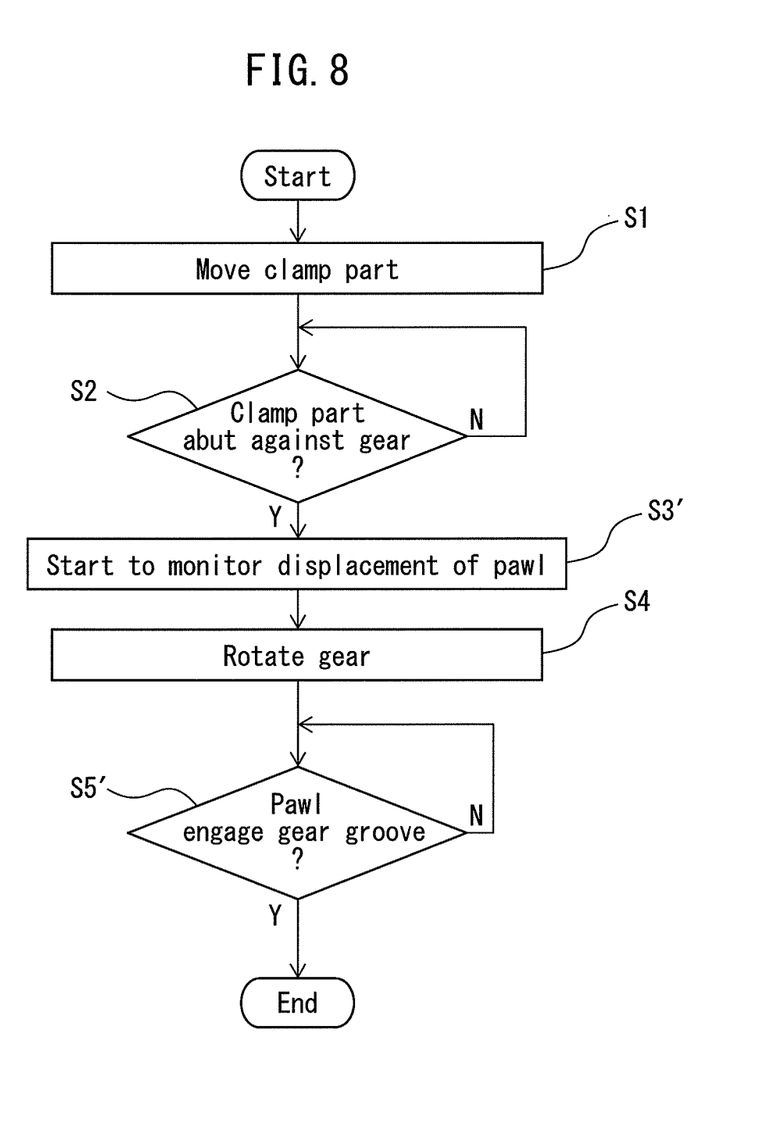
FIG. 8 is a flow chart of an example of an operation method of the gear gripping device shown in FIG. 7.

When detecting the displacements of the pawls 30, 32, 40, and 42, the controller 62 determines that the pawls 30, 32, 40, and 42 have suitably engaged the gear grooves $G_g$ (i.e., determines "YES"), and ends the flow shown in FIG. 8. On the other hand, when the controller 62 could not detect the displacements of the pawls 30, 32, 40, and 42 at step S5', the controller 62 determines that the pawls 30, 32, 40, and 42 have not yet engaged the gear grooves $G_g$ (i.e., determines "NO"), and loops the step S5'.

In this way, according to this embodiment, the controller 62 clamps the gear G with a relatively weak force which would not damage the gear G, then rotates the gear G so as to suitably engage the pawls 30, 32, 40, and 42 with the gear G. According to this configuration, it is possible to suitably engage the pawls 30, 32, 40, and 42 with the gear G, while preventing the damage to the gear G.

Further, according to this embodiment, the controller 62 determines whether the gear grooves $G_g$ and the pawls 30, 32, 40, and 42 have engaged each other based on the displacements of the pawls 30, 32, 40, and 42. According to this configuration, it is possible to detect the engagement between the gear grooves $G_g$ and the pawls 30, 32, 40, and 42 by a simple device with a high precision.

Note that, in the above-mentioned embodiment, a case is described where the first drive part 18 includes the servo motor. However, the first drive part may include e.g. a cylinder. In this case, the first drive part drives the first clamp part 14 and the second clamp part 16 so as to approach each other by a predetermined drive force.

The drive force of the cylinder at this time is set to a force of magnitude which would not damage the gear G when the gear G is held between the first clamp part 14 and the second clamp part 16 at step S2. Further, the above-mentioned displacement detection part 64 may detect a stroke of the cylinder shaft.

Further, in the above-mentioned embodiment, a case is described where the first clamp part 14 and the second clamp part 16 are driven by the first drive part 18 so as to be synchronized with each other. However, the first clamp part 14 and the second clamp part 16 may be driven independently from each other by individual drive parts.

Further, in the above-mentioned embodiment, a case is described where the gear gripping device 10, 60 includes a pair of the first clamp part 14 and the second clamp part 16 which approach and separate from each other. However, the gear gripping device may include a first clamp part 14 capable of approaching the gear G and a fixed member provided to be unmovable relative to the gear G.

In this case, the fixed member is arranged to contact the gear G in advance, and the first drive part drives only the first clamp part 14 to approach the gear G. Then, the first clamp part 14 and the fixed member clamp the gear G therebetween. The fixed member may or may not have a pawl which can engage the gear G.

Further, in the above-mentioned embodiment, a case is described where the gear gripping device 10, 60 includes a plurality of pawls 30, 32, 40, and 42. However, the gear gripping device may include at least one pawl provided to be movable so as to approach the circumference of the gear. Even if the gear gripping device is provided with just one pawl, it is possible to unrotatably hold the gear G when the pawl suitably engages the gear G.

Further, in the above-mentioned embodiment, a case is described where the controller 12, 62 rotates the gear G after having detected that the first clamp part 14 and the second clamp part 16 abut against the gear at the step S2.

However, the controller 12, 62 may execute step S4 just before step S1 or in parallel with step S1, and abut the first clamp part 14 and the second clamp part 16 against the rotating gear G.

By such operation method, the controller 12, 62 can suitably engage the pawls 30, 32, 40, and 42 with the gear grooves $G_g$ as shown in FIG. 6, and can detect the engagement between the pawls 30, 32, 40, and 42 and the gear grooves $G_g$ at the above-mentioned step S5, S5'.

In such operation method, the rotational speed of the gear G at step S4 may be set to a relatively low rotational speed which would not damage the gear G when abutting the first clamp part 14 and the second clamp part 16 against the gear G.

Above, embodiments of the invention were used to explain the invention, but the above embodiments do not limit the inventions according to the claims. Further, combinations of the features which are explained in the embodiments of the invention may be included in the technical scope of the invention. However, not all of the combinations of these features are necessarily essential for the solution of the invention. Further, the fact that the above embodiments can be changed or improved in various ways would be clear to a person skilled in the art.

Further, it should be noted that the operations, routines, steps, stages, and other processing in the apparatus, system, program, and method in the claims, specification, and drawings, unless particularly clearly indicated by "before", "in advance", etc. or the output of prior processing being used for later processing, can be realized in any order. In the flow of operations in the claims, specification, and drawings, even if explained using "first", "next", "then", etc. for convenience, this does not mean the execution in this order is essential.

The invention claimed is:

1. A gear gripping device comprising:
 a pawl provided to be movable so as to approach a circumference of a gear and capable of engaging a gear groove formed at the circumference of the gear;
 a first drive part which drives the pawl so as to abut against the circumference of the gear;
 a second drive part which rotates the gear in a circumferential direction of the gear; and
 an engagement detection part which detects whether the pawl engages the gear groove.

2. The gear gripping device according to claim 1, further comprises a pair of clamp parts provided to be movable so as to approach each other, each of the pair of clamp parts including the pawl, wherein
 the first drive part drives the pair of clamp parts so as to approach each other, thereby hold the circumference of the gear between the pair of clamp parts.

3. The gear gripping device according to claim 1, wherein the first drive part or the second drive part includes a servo motor.

4. The gear gripping device according to claim 1, wherein the engagement detection part:

monitors a load torque applied to the second drive part during the pawl abuts against the circumference of the gear; and detects that the pawl engages the gear groove, when the load torque changes.

5. The gear gripping device according to claim 1, wherein the engagement detection part:

monitors the displacement of the pawl during the pawl abuts against the circumference of the gear; and detects that the pawl engages the gear groove, when the displacement occurs.

6. A method of gripping a gear, comprising:

moving a pawl capable of engaging a gear groove formed at a circumference of the gear, and abutting the pawl against the circumference of the gear;

rotating the gear in a circumferential direction of the gear; and detecting whether the pawl engages the gear groove.

7. The method according to claim 6, further comprising:

monitoring a load torque applied to a drive part for rotating the gear, after abutting the pawl against the circumference of the gear; and detecting that the pawl engages the gear groove, when the load torque changes.

8. The method according to claim 6, further comprising:

monitoring a displacement of the pawl, after abutting the pawl against the circumference of the gear; and detecting that the pawl engages the gear groove, when the displacement occurs.

* * * * *